(12) United States Patent
Popovic et al.

(10) Patent No.: US 10,708,900 B2
(45) Date of Patent: *Jul. 7, 2020

(54) GENERATING AND TRANSMITTING DEMODULATION REFERENCE SIGNALS

(71) Applicant: HUAWEI TECHNOLOGIES CO.,LTD., Shenzhen, Guangdong (CN)

(72) Inventors: Branislav Popovic, Kista (SE); Weijun Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,933

(22) Filed: Jul. 25, 2018

(65) Prior Publication Data

US 2018/0332571 A1 Nov. 15, 2018

Related U.S. Application Data

(63) Continuation of application No. 15/198,449, filed on Jun. 30, 2016, now Pat. No. 10,098,104, which is a continuation of application No. 14/330,095, filed on Jul. 14, 2014, now Pat. No. 9,397,812, which is a continuation of application No. PCT/EP2012/050506, filed on Jan. 13, 2012.

(51) Int. Cl.
*H04W 72/04* (2009.01)
*H04L 25/02* (2006.01)
*H04L 5/00* (2006.01)

(52) U.S. Cl.
CPC ......... *H04W 72/042* (2013.01); *H04L 5/0048* (2013.01); *H04L 5/0051* (2013.01); *H04L 25/0204* (2013.01); *H04L 5/0094* (2013.01); *H04L 25/0224* (2013.01)

(58) Field of Classification Search
CPC . H04L 5/0048; H04L 5/0051; H04L 25/0204; H04L 25/0224; H04W 72/042
USPC .......................................................... 370/330
See application file for complete search history.

(56) References Cited

U.S. PATENT DOCUMENTS

| 8,009,606 B2 | 8/2011 | Seo et al. |
| 2009/0201863 A1 | 8/2009 | Pi |
| 2010/0062783 A1 | 3/2010 | Luo et al. |
| 2010/0118807 A1 | 5/2010 | Seo et al. |

(Continued)

FOREIGN PATENT DOCUMENTS

| CN | 101873609 A | 10/2010 |
| WO | 2011017973 A1 | 2/2011 |

(Continued)

OTHER PUBLICATIONS

NEC Group,"Benefits of TDM-like structure for E-PDCCH control channel",TSG-RAN WG1#67 R1-113872,Nov. 14-18, 2011,total 4 pages.

(Continued)

*Primary Examiner* — Phong La
(74) *Attorney, Agent, or Firm* — Leydig, Voit & Mayer, Ltd.

(57) ABSTRACT

The present disclosure provides a solution which solves the problem of demodulation reference signal (DMRS) ambiguity by introducing separate, i.e. different DMRSs. This is especially the case for systems employing dynamic allocation of control and data signals to different PRBs.

20 Claims, 4 Drawing Sheets

(56) References Cited

U.S. PATENT DOCUMENTS

| | | |
|---|---|---|
| 2010/0195566 A1 | 8/2010 | Krishnamurthy et al. |
| 2011/0085506 A1 | 4/2011 | Lee et al. |
| 2011/0103295 A1 | 5/2011 | Khandekar et al. |
| 2011/0134871 A1* | 6/2011 | Nogami ............... H04L 5/0044 370/329 |
| 2011/0249633 A1 | 10/2011 | Hong et al. |
| 2011/0310829 A1* | 12/2011 | Ji ........................ H04L 5/0037 370/329 |
| 2012/0128950 A1* | 5/2012 | Kang ................. C04B 20/1029 428/210 |
| 2012/0218950 A1 | 8/2012 | Yu et al. |
| 2013/0044692 A1* | 2/2013 | Nory .................... H04L 5/0048 370/329 |
| 2013/0044693 A1 | 2/2013 | Lindh et al. |
| 2014/0169328 A1 | 6/2014 | Ahimezawa et al. |
| 2014/0307700 A1* | 10/2014 | Seo ...................... H04L 5/0053 370/329 |
| 2015/0181573 A1 | 6/2015 | Takeda et al. |

FOREIGN PATENT DOCUMENTS

| | | | |
|---|---|---|---|
| WO | 2011085195 A1 | 7/2011 | |
| WO | WO-2011085195 A1 * | 7/2011 | ............. H04L 5/001 |

OTHER PUBLICATIONS

Ericsson, ST-Ericsson,"Reference signals for enhanced control channels",3GPP TSG-RAN WG1 #67 R1-113678,San Francisco, Nov. 14-18, 2011,total 2 pages.

Sharp,"DL control channel enhancement for DL MIMO in Rel. 11",3GPP TSG RAN WG1 Meeting #66bis R1-113352, Zhuhai, China, Oct. 10-14, 2011,total 6 pages.

Ericsson, ST Ericsson,"Enhancements for UE specific control signaling",3GPP TSG-RAN WG1 #65 Tdoc R1-111332, Barcelona, Spain, May 9-13, 2011,total 3 pages.

3GPP TS 36.213 V10.4.0 (Dec. 2011);3rd Generation Partnership Project;Technical Specification Group Radio Access Network;Evolved Universal Terrestrial Radio Access (E-UTRA);Physical layer procedures(Release 10),total 125 pages.

3GPP TS 36.211 V10.4.0 (Dec. 2011);3rd Generation Partnership Project;Technical Specification Group Radio Access Network;Evolved Universal Terrestrial Radio Access (E-UTRA);Physical Channels and Modulation(Release 10),total 101 pages.

Huawei, HiSilicon,"ePDCCH multiplexing with PDSCH",3GPP TSG RAN WG1 Meeting #67 R1-113654,San Francisco, USA, Nov. 14-18, 2011,total 5 pages.

Nokia, Nokia Siemens Networks,"Search space design for TDM based E-PDCCH",3GPP TSG RAN WG1 Meeting #67 R1-114331,San Francisco, USA, Nov. 14-18, 2011,total 4 pages.

Huawei, HiSilicon,"DMRS sequences for ePDCCH",3GPP TSG RAN WG1 meeting #68 R1-120870,Dresden, Germany, Feb. 6-10, 2012,total 8 pages.

3GPP TS 36.211 V10.3.0 (Sep. 2011);3rd Generation Partnership Project;Technical Specification Group Radio Access Network;Evolved Universal Terrestrial Radio Access (E-UTRA);Physical Channels and Modulation(Release 10),total 7 pages.

ETRI,"DM RS sequence setting for downlink CoMP",3GPP TSG RAN WG1 Meeting #67 R1-113957,San Francisco, USA, Nov. 14-18, 2011,total 3 pages.

Huawei, HiSilicon, "Considerations on the ePDCCH design", 3GPP TSG RAN WG1 Meeting #67 R1-113655, San Francisco, USA, Nov. 14-18, 2011, total 5 pages.

Ericsson, ST-Ericsson,"On enhanced PDCCH design",3GPP TSG-RAN WG1 #66bis R1-112928,Zhuhai, China, Oct. 10-14, 2011,total 3 pages.

\* cited by examiner

GENERATING AND TRANSMITTING DEMODULATION REFERENCE SIGNALS

CROSS-REFERENCE TO RELATED APPLICATIONS

This application is a continuation of U.S. patent application Ser. No. 15/198,449, filed on Jun. 30, 2016, which is a continuation of U.S. patent application Ser. No. 14/330,095, filed on Jul. 14, 2014, now U.S. Pat. No. 9,397,812, which is a continuation of International Application No. PCT/EP2012/050506, filed on Jan. 13, 2012, All of the aforementioned patent applications are hereby incorporated by reference in their entireties.

TECHNICAL FIELD

The present disclosure relates to a method for generating and transmitting demodulation reference signals, and to a corresponding method in a receiver node. Furthermore, the disclosure also relates to a transmit device, a receiver device, a computer program, and a computer program product thereof.

BACKGROUND

In a cellular communication system, the downlink (DL) denotes the transmission of the synchronization signals and information from a base station (e.g. eNB) to a mobile user (e.g. a UE). On the uplink (UL) the transmission direction is the opposite.

The DL of LTE cellular communication system is based on Orthogonal Frequency Division Multiplex (OFDM) transmission, using both time and frequency resource units for information transmission. The OFDM signal includes a set of complex sinusoids, called subcarriers, whose frequencies are consecutive integer multiples of the basic (the lowest non-zero) subcarrier frequency, where each complex sinusoid is weighted by a modulation symbol conveying certain number of information bits. In the time domain an OFDM symbol period includes an active part and a cyclic prefix part. The duration of active part is the inverse of the basic subcarrier frequency. A cyclic prefix (CP) is a signal appended at the beginning of each OFDM symbol, and it includes a last portion of active OFDM symbol waveform.

The smallest time-frequency resource unit for DL LTE information transmission is called resource element (RE), occupying a single complex sinusoid frequency in an OFDM symbol. For the purpose of scheduling transmissions to different UEs, the REs are grouped into larger units called physical resource blocks (PRB). A PRB occupies a half (called "slot") of a subframe, i.e. $N_{symb}^{DL}=7$ (with normal cyclic prefix length) consecutive OFDM symbol intervals in time domain, and $N_{sc}^{RB}=12$ consecutive subcarrier frequencies in frequency domain (occupying in total 180 KHz).

The two PRBs in a subframe occupying the same subcarriers form a PRB pair. Each PRB is labeled by a unique PRB number, which is an index denoting the position of the subband that the PRB occupies within a given bandwidth. The PRBs are numbered from 0 to $N_{RB}^{DL}-1$ within a given bandwidth. Thus, the maximum LTE bandwidth (20 MHz) contains the maximum number (110) of PRBs, which is in LTE standard denoted by $N_{RB}^{max,DL}=110$. The relation between the PRB number $n_{PRB}$ in the frequency domain and resource elements (k, l) in a slot is given by $$n_{PRB} = \left\lfloor \frac{k}{N_{sc}^{RB}} \right\rfloor.$$

The physical downlink control channel (PDCCH) is defined as a signal containing information needed to receive and demodulate user-specific information transmitted from the eNB to a UE through another signal, called physical downlink shared channel (PDSCH). The PDCCH is transmitted in the control channel region occupying a few OFDM symbols at the beginning of each UE-specific basic transmission time interval of 1 ms, called downlink subframe, which is the minimum time resource that can be allocated to a single UE. The number of OFDM symbols in each control channel region ranges from 1 to 3 as indicated by physical control format indicator channel (PCFICH) in each DL subframe.

Downlink control information (DCI) conveyed by PDCCH includes information necessary to demodulate related PDSCH or physical uplink shared channel (PUSCH), such as time-frequency resource allocation, used modulation and coding scheme (MCS), etc. Error detection on DCI transmissions is provided through the Cyclic Redundancy Check (CRC). The CRC bits, calculated from the DCI information bits, are attached to the DCI.

To demodulate the PDCCH signal the UE needs the estimate of the propagation channel. The channel estimate is obtained from reference signals (RS) transmitted through specially allocated REs. The RSs are also used to define so-called antenna ports (APs). An AP is the baseband input into the corresponding separate antenna system. An antenna system includes an RF chain connected to one or multiple antenna elements that should together produce a desired electro-magnetic radiation pattern. If there is more than one transmit antenna port, and more than one receive antenna port, the transmission is usually classified as Multiple Input Multiple Output (MIMO) transmission. The corresponding propagation paths between each transmit antenna port and each receive antenna port jointly define a MIMO propagation channel. On the LTE DL the different RSs are transmitted on different antenna ports, and thus can serve at the UE to identify separate propagation paths in MIMO propagation channel. In this way each RS defines a unique AP.

Up to eight DMRS antenna ports {7, 8, 9, 10, 11, 12, 13, 14} are defined to support up to eight spatial layers PDSCH transmission in LTE Rel-10. PDSCH is directly mapped onto the antenna ports defined by DMRS as illustrated in FIG. 2, showing the case of rank 2 transmission via AP 7 and AP 8. In FIG. 1 the mapping between APs and physical antennas depends on the implementation, and thus is not specified in the standard.

There are three types of DL reference signals in LTE:
a) common reference signals (CRS) are broadcasted by a base station to all UEs;
b) UE-specific channel state information reference signals (CSI-RS); and
c) UE-specific demodulation reference signals (DMRS).

The first two kinds of RSs are used in the UE for calculating the channel quality indicator (CQI), the parameter which is feedback to the base station to help in determining which UE should be scheduled for the subsequent transmission. The third kind of RS, the DMRS, is used to demodulate the data transmitted on PDSCH in the same PRB as that DMRS. Note however that in some transmission modes of PDSCH the DMRSs are not transmitted, so only the CRS is used for the demodulation of PDSCH in these transmission modes. Besides, the CRS s are the only reference signals used for the demodulation of the PDCCH signals.

All of the RSs are characterized by a unique combination of the particular time-frequency pattern of their REs and the modulation sequence whose elements modulate these REs. There are two possible time-frequency patterns of DMRSs within a PRB pair, as shown in FIGS. 2A and 2B.

According to FIGS. 2A and 2B, a DMRS modulation sequence $\{a_p(k)\}$, k=0, 1, . . . , 11, can be represented by a 3×4 DMRS modulation matrix $A_p$, as:

$$A_p = \begin{bmatrix} a_p(0) & a_p(3) & a_p(6) & a_p(9) \\ a_p(1) & a_p(4) & a_p(7) & a_p(10) \\ a_p(2) & a_p(5) & a_p(8) & a_p(11) \end{bmatrix}. \quad (1)$$

The DMRS modulation sequence $\{a_p(k)\}$ in each of the scheduled PRB pairs is obtained by multiplying symbol-by-symbol its antenna port (AP) sequence $\{w_p(k)\}$ with a PRB scrambling sequence $\{q(n_{PRB},k)\}$, i.e.

$$a_p(k)=w_p(k)q(n_{PRB},k), k=0,1,\ldots,11 \quad (2).$$

The AP sequences are used to make the DMRSs that share a common time frequency pattern orthogonal, either over a slot, or over a subframe. An AP sequence $\{w_p(k)\}$ can be defined through the concatenation of columns of the matrix $W_p$, $$W_p = \begin{bmatrix} w'_p(0) & w'_p(1) & w'_p(2) & w'_p(3) \\ w'_p(3) & w'_p(2) & w'_p(1) & w'_p(0) \\ w'_p(0) & w'_p(1) & w'_p(2) & w'_p(3) \end{bmatrix}, \quad (3)$$

where (as in the matrix (1)) each row contains the modulation symbols of REs at the same subcarrier frequency. The symbols of matrix (3) are given in Table 1 below.

TABLE 1

AP sequence symbols for DMRS ports 7 to 14

| Antenna port p | $w_p'(0)$ | $w_p'(1)$ | $w_p'(2)$ | $w_p'(3)$ |
|---|---|---|---|---|
| (a) when ($n_{PRB}$ mod 2) = 0 ||||| 
| 7 | 1 | 1 | 1 | 1 |
| 8 | 1 | −1 | 1 | −1 |
| 9 | 1 | 1 | 1 | 1 |
| 10 | 1 | −1 | 1 | −1 |
| 11 | 1 | 1 | −1 | −1 |
| 12 | −1 | −1 | 1 | 1 |
| 13 | 1 | −1 | −1 | 1 |
| 14 | −1 | 1 | 1 | −1 |
| (b) when ($n_{PRB}$ mod 2) = 1 ||||| 
| 7 | 1 | 1 | 1 | 1 |
| 8 | −1 | 1 | −1 | 1 |
| 9 | 1 | 1 | 1 | 1 |
| 10 | −1 | 1 | −1 | 1 |
| 11 | −1 | −1 | 1 | 1 |
| 12 | 1 | 1 | −1 | −1 |
| 13 | 1 | −1 | −1 | 1 |
| 14 | −1 | 1 | 1 | −1 |

The structure of the AP sequences $\{w_p(k)\}$ given by (3) implies that, at given subcarrier frequency, the propagation channel is considered constant over a subframe because only in that case the different APs occupying the same time frequency positions can be orthogonally separated by correlation in the receiver. Such correlation implies that the DMRS REs are averaged to suppress the additive noise at the receiver, resulting in a single channel coefficient at given subcarrier frequency within a subframe.

Additionally, even the DMRS averaging over all subcarrier frequencies within a PRB pair is possible, because the LTE standard specifies that the proprietary precoding of antenna ports 7 to 14 at the base station has to be constant over all subcarrier frequencies of at least one PRB bandwidth. In this way the UE receiver can only see one propagation channel coefficient within a PRB pair of an observed antenna port, even if some antenna port precoding is done at the base station transmitter, as the precoding coefficient is included in all the estimated propagation channel coefficients.

The PRB scrambling sequence $\{q(n_{PRB},k)\}$ is generated by taking a 12-symbols long segment of a long complex (quadriphase) pseudo-random sequence $\{r(m)\}$, m=0, 1, . . . , $12N_{RB}^{max,DL}-1$ that falls into the observed PRB after mapping $\{r(m)\}$ to all REs allocated to the DMRSs in the whole bandwidth.

Similarly as an AP sequence, a PRB scrambling sequence $\{g(n_{PRB},k)\}$ can be defined through the concatenation of columns of the matrix $Q(n_{PRB})$, $$Q(n_{PRB}) = \begin{bmatrix} r(n_{PRB}+2) & r(n_{PRB}+2+3N_{RB}^{max,DL}) & r(n_{PRB}+2+6N_{RB}^{max,DL}) & r(n_{PRB}+2+9N_{RB}^{max,DL}) \\ r(n_{PRB}+1) & r(n_{PRB}+1+3N_{RB}^{max,DL}) & r(n_{PRB}+1+6N_{RB}^{max,DL}) & r(n_{PRB}+1+9N_{RB}^{max,DL}) \\ r(n_{PRB}) & r(n_{PRB}+3N_{RB}^{max,DL}) & r(n_{PRB}+6N_{RB}^{max,DL}) & r(n_{PRB}+9N_{RB}^{max,DL}) \end{bmatrix}, \quad (4)$$

where (as in the matrix (1)) each row contains the modulation symbols of REs at the same subcarrier frequency. From (4) it follows that a PRB scrambling sequence $\{q(n_{PRB},k)\}$ can be defined as:

$$q(n_{PRB},k)=r(n_{PRB}+2-k \bmod 3+\lfloor k/3 \rfloor 3N_{RB}^{max,DL}), k=0, 1,\ldots,11 \quad (5),$$

where $\lfloor x \rfloor$ denotes the largest integer not greater than x.

The PRB scrambling sequence depends on the cell ID and a UE-specific parameter which can have two possible values, which can be independently set by the base station at the beginning of each subframe. This parameter is sent to the UE via PDCCH. All UE-specific DMRS ports (7 to 14) have a common PRB scrambling sequence, which can change from subframe to subframe, having one of totally two possible versions, depending of base station scheduler decisions.

It has been widely recognized that the control channel region for LTE PDCCH might be insufficient in future deployment scenarios where a significant increase of the number of users in the system is expected. Additionally, in order to reduce transmission overhead in the future systems the CRS might be removed, making the demodulation of PDCCH not feasible. The major direction in finding the way to increase the capacity of PDCCH and reduce transmission overhead is to introduce a UE-specific control channel, so-called e-PDCCH, which is supposed to be dynamically scheduled by the base station to each individual UE, in a similar way as it is routinely done for the transmission of UE-specific information content on PDSCH.

A similar approach has already been adopted in LTE Rel. 10 for the definition of relay node operation. A relay node (RN) is defined as supplementary reception and transmission facility, whose task is to extend the coverage of base stations, both in the downlink and uplink. On the downlink, a RN receives control information from the base station via so-called relay physical downlink control channel (R-PDCCH). The R-PDCCH conveys information necessary to demodulate related PDSCH at RN, or PUSCH transmission from the RN. The time-frequency resources of R-PDCCH are fundamentally different from those of PDCCH: the R-PDCCH PRBs are scheduled and multiplexed with the PDSCH PRBs, both in time and frequency.

The R-PDCCH can be demodulated using either CRS or DMRS reference signals mentioned before; the type of reference signals is configured at the eNB and then signaled to the higher layers software in the RN via the data transmitted over PDSCH. Since the channel between an eNB and a fixed RN varies very slowly in time domain, the PRBs scheduled for R-PDCCH remain optimum within a very long time period and therefore may be signaled to the higher layers software in the RN, meaning that the resource allocation information is transmitted via the data bits over PDSCH, to be interpreted and implemented by higher layers software in the RN.

A similar approach can be adopted for the design of e-PDCCH, so that the e-PDCCH is transmitted through the UE-specific specially scheduled PRBs. However, since the channel between an eNB and a UE varies much faster, both in time and frequency, than that between an eNB and a fixed RN, the PRBs scheduled for e-PDCCH can only work within a short time period, meaning that they should be indicated in a relatively frequent manner to the desired UE. As the e-PDCCH is supposed to ultimately replace the PDCCH, and as the frequent resource allocation signaling to the higher layers of the UE would consume capacity of PDSCH, it will be assumed further on that the information about UE-specific scheduled e-PDCCH resource allocation is not signaled to the UE.

Thus the key problem in designing a stand-alone, independently scheduled e-PDCCH is how to detect in the UE the time-frequency resources dynamically allocated to each newly scheduled e-PDCCH transmission, where the allocated e-PDCCH resources can be localized or distributed in frequency domain.

An immediate solution is to use blind decoding at the UE, where the UE tries to detect its e-PDCCH at all possible frequency positions of the PRB pairs within given time-frequency and antenna ports search space. The blind detection includes demodulation of assumed e-PDCCH REs, to obtain the control channel information bits appended by CRC (Cyclic Redundancy Check) bits calculated at the transmitter, followed by the comparison of these demodulated CRC bits with the "reconstructed" CRC bits calculated by the UE from the demodulated control channel information bits. If the demodulated and the reconstructed CRC bits are the same, the e-PDCCH is considered to be found and successfully decoded.

Such a solution has a large implementation complexity in terms of required number of operations. For example, assuming up to 100 PRB pairs within the system bandwidth and an e-PDCCH with size of either 1 or 2 or 4 PRB pairs, if the e-PDCCH is transmitted via one antenna port, the number of the maximal possible detection on an antenna port is as huge as:

$$\binom{100}{1} + \binom{100}{2} + \binom{100}{4} = 3926275, \text{ where}$$

$$\binom{n}{m} = \frac{n*(n-1)*\ldots*(n-m+1)}{m*(m-1)*\ldots*1}.$$

Furthermore, if 4 antenna ports are considered as candidate antenna ports, the total number of the maximal possible detection over all candidate antenna ports will be as high as 4 times the above number.

Thus, it is an open problem how to design the downlink transmission method which would allow for an efficient detection in the UE of the time-frequency resources dynamically allocated and used by the base station for the transmission of UE-specific control information.

According to a prior art solution, the frequency location for the e-PDCCH is indicated by a new DCI format transmitted in the PDCCH region. The UEs first performs blind detection in the PDCCH region to find the new DCI format and then determines whether there is e-PDCCH in the data region according to the status of the new DCI format detection. Hence, the detection of e-PDCCH really relies on detecting the new DCI format in the PDCCH region. This design is hierarchical, and is illustrated in FIG. 3. Obviously, this solution relies on explicit signaling of scheduled e-PDCCH time-frequency resources (via PDCCH), so it does not solve the problem under assumptions as mentioned.

According to another prior art solutions a semi-static configuration method was proposed to indicate e-PDCCH time-frequency resources by high layer signaling. However, since the semi-static configuration via high layer signaling usually have much longer transmission time delay, it is difficult to adapt to the time-varying fast fading channel.

SUMMARY

Therefore an aspect of the present disclosure is to provide a solution which mitigates or solves the drawbacks and problems of prior art solutions.

According to a first aspect, a method of transmitting a demodulation reference signal (DMRS) in a wireless communication system is disclosed. Time-frequency resource elements (REs) are used in the wireless communication system for transmission of information. The method includes:

generating at least one first receiver specific DMRS, the at least one first receiver specific DMRS being associated with a data channel generating at least one second receiver specific DMRS, the at least one second receiver specific DMRS being associated with a control channel, the control channel being associated with the data channel, the at least one second receiver specific DMRS being different from the at least one first receiver specific DMRS;

transmitting the at least one first receiver specific DMRS with the data channel, wherein time-frequency REs of a first physical resource block (PRB) are utilized for transmission of the data channel and the at least one first receiver specific DMRS, and time-frequency REs of the first PRB being utilized for transmission of the at least one first receiver specific DMRS locate in a first set of RE positions in a PRB; and transmitting the at least one second receiver specific DMRS with the control channel, wherein time-frequency REs of a second PRB are utilized for transmission of the control channel and the at least one second receiver specific DMRS, time-frequency REs of the second PRB being utilized for transmission of the at least one second receiver specific DMRS locate in a second set of RE positions in a PRB, and the second set of RE positions in a PRB overlap with the first set of RE positions in a PRB.

According to a second aspect, a method of utilizing a demodulation reference signal (DMRS) in a wireless communication system is disclosed. Time-frequency resource elements (REs) are used in the wireless communication system for transmission of information. The method includes:

receiving at least one first receiver specific DMRS associated with a data channel, wherein time-frequency REs of a first physical resource block (PRB) are utilized for transmission of the data channel and the at least one first receiver specific DMRS, and time-frequency REs of the first PRB being utilized for transmission of the at least one first receiver specific DMRS locate in a first set of RE positions in a PRB;

receiving at least one second receiver specific DMRS associated with a control channel, wherein the control channel is associated with the data channel, the at least one second receiver specific DMRS is different from the at least one first receiver specific DMRS, time-frequency REs of a second PRB are utilized for transmission of the control channel and the at least one second receiver specific DMRS, time-frequency REs of the second PRB being utilized for transmission of the at least one second receiver specific DMRS locate in a second set of RE positions in a PRB, and the second set of RE positions in a PRB overlap with the first set of RE positions in a PRB; and demodulating the control channel by using the at least one second receiver specific DMRS.

Each of the above mentioned methods may also be executed in an apparatus. The apparatus includes a memory retaining instructions and a processor. The instructions relate to steps of a method. The processor is coupled to the memory and is configured to execute the instructions retained in the memory.

The present disclosure provides a solution which solves the problem of DMRS ambiguity by introducing separate, i.e. different DMRSs. This is especially the case for systems employing dynamic allocation of control and data signals to different PRBs.

Further applications and advantages of the disclosure will be apparent from the following detailed description.

BRIEF DESCRIPTION OF THE DRAWINGS

The appended drawings are intended to clarify and explain different embodiments of the present disclosure in which.

DESCRIPTION OF EMBODIMENTS

Figure 1:
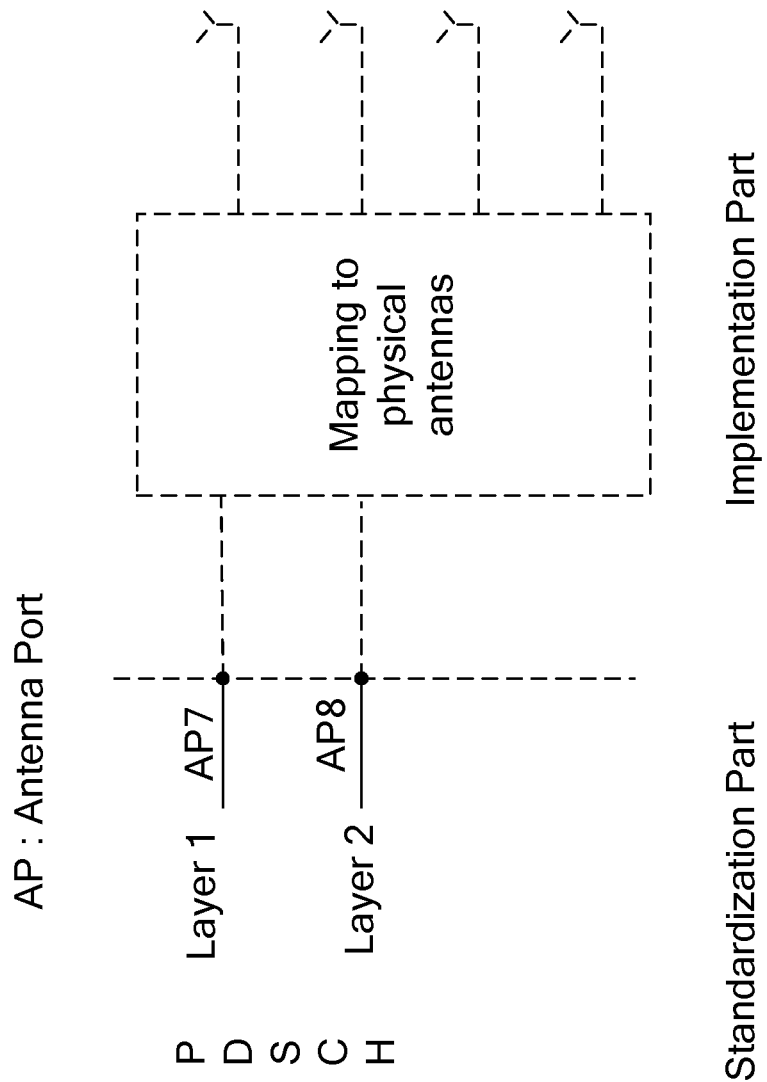
FIG. 1 illustrates mapping of different antenna ports.
Figure 2A:
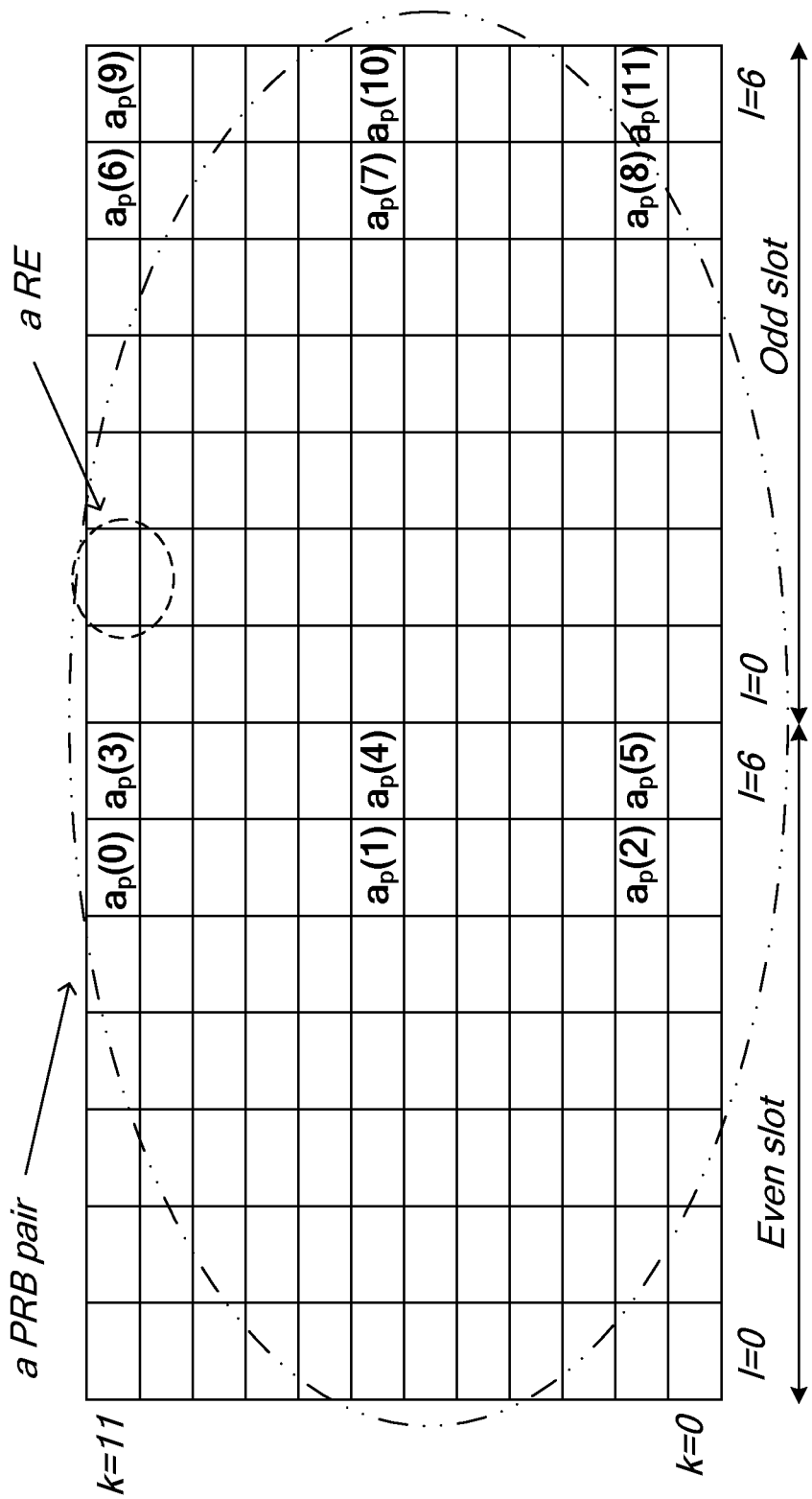
FIGS. 2A and 2B shows two possible time-frequency patterns of DMRSs within a PRB pair.
Figure 2B:
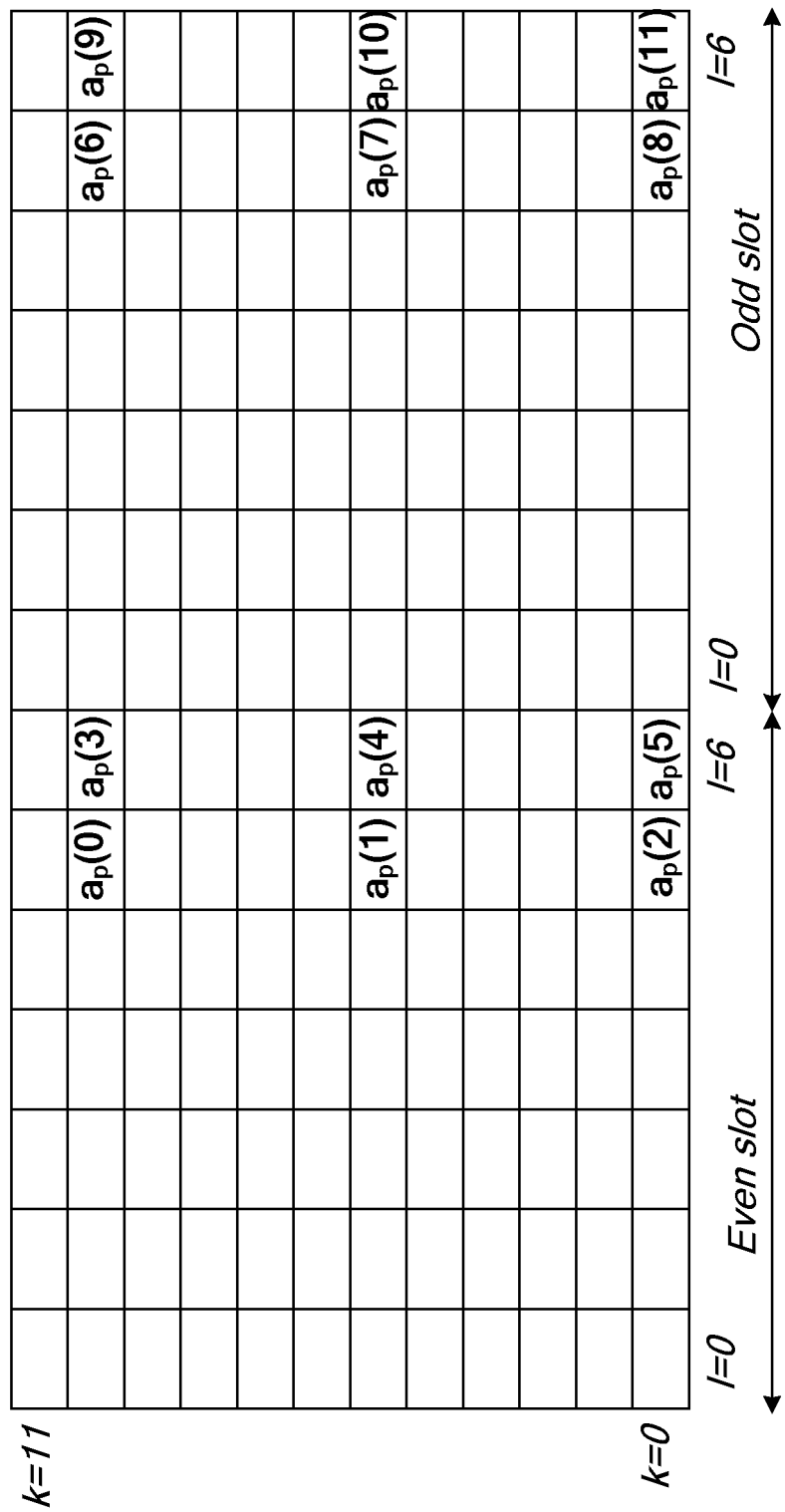
Figure 3:
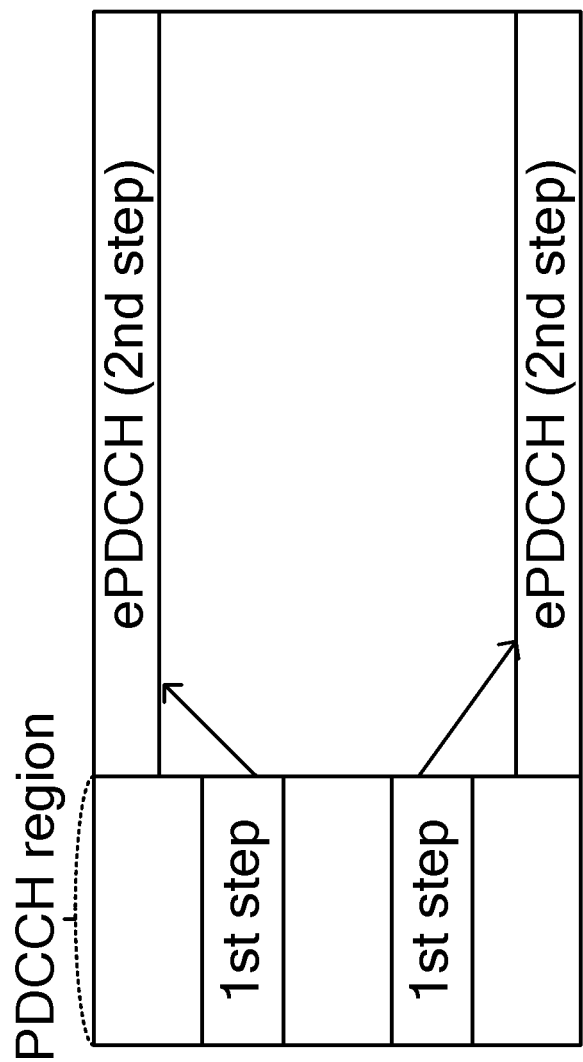
FIG. 3 illustrates the indication of dynamic resource allocation of e-PDCCH from the control information conveyed in PDCCH.

To achieve the aforementioned and other aspects, the present disclosure relates to a method in a transmit node and to a corresponding method in a receiver node. The method in a transmit node according to the disclosure comprises the steps of: generating at least one first receiver specific demodulation reference signal (PDSCH-DMRS) associated with a receiver specific data channel signal (PDSCH); generating at least one second receiver specific demodulation reference signal (e-PDCCH-DMRS) associated with a receiver specific control channel signal (e-PDCCH); transmitting said receiver specific control channel signal (e-PDCCH) concurrently with the associated second receiver specific demodulation reference signal (e-PDCCH-DMRS); and transmitting the receiver specific data channel signal (PDSCH) concurrently with the associated first receiver specific demodulation reference signal (PDSCH-DMRS). Concurrently in this context should be interpreted as meaning "at the same time".

The method in a receiver node according to the disclosure comprises the steps of: receiving at least one receiver specific control channel signal (e-PDCCH) generated according to the method above and an associated second receiver specific demodulation reference signal (e-PDCCH-DMRS); receiving at least one receiver specific data channel signal (PDSCH) generated according to the method above and an associated first receiver specific demodulation reference signal (PDSCH-DMRS); demodulating the receiver specific control channel signal (e-PDCCH) by using the associated second receiver specific demodulation reference signal (e-PDCCH-DMRS); and using information derived from the step of demodulating the receiver specific control channel signal (e-PDCCH) for demodulating the receiver specific data channel signal (PDSCH).

According to an embodiment of the disclosure the method in the transmit node further comprises the step of: dynamically allocating the receiver specific data channel signal (PDSCH) and the receiver specific control channel signal (e-PDCCH) to different PRBs.

According to yet another embodiment of the disclosure the method in the transmit node includes: generating the first receiver specific demodulation reference signal (PDSCH-DMRS) by using a first sequence of symbols $\{a_p(k)\}$, $k=0, 1, \ldots, L-1$ for modulating time-frequency resource elements at fixed positions within physical resource blocks used for transmission of data channel signals (PDSCHs) at a transmit antenna port p; and generating the second receiver specific demodulation reference signal (e-PDCCH-DMRS) by using a second sequence of symbols $\{b_{u,p}(k)\}$, $k=0, 1, \ldots, L-1$ for modulating time-frequency resource elements at fixed positions within physical resource blocks used for transmission of e-PDCCHs at a transmit antenna port p. The second sequence of symbols $\{b_{u,p}(k)\}$ is a u-th sequence from a set of U sequences that can be allocated to one or more receiver nodes (such as UEs) in said wireless communication system.

As the DMRSs are transmitted in the same PRBs as the corresponding e-PDCCH or PDSCH signals, searching for a receiver-specific DMRS modulation sequence at the receiver, in all PRBs within a given time-frequency search space, and in all possible antenna ports that can be used for the transmission of DMRSs, can result in identifying the PRBs allocated for the transmission of either e-PDCCH or PDSCH signal. The major problem in that case would be that the receiver could not determine whether the detected PRBs are allocated to the e-PDCCH or to the PDSCH signal, as in the current LTE system any UE-specific DMRS modulation sequence is the same for both of these signals.

In order to resolve the DMRS ambiguity the present disclosure introduces separate, i.e. different DMRSs for e-PDCCH and for PDSCH, respectively, such that both are UE-specific, both are using the same time-frequency REs, but are using different DMRS modulation sequences. The e-PDCCH-specific DMRS modulation sequence would allow the UE to unambiguously identify detected the PRB allocated to the e-PDCCH.

To reduce the complexity of searching the e-PDCCH DMRS, as well as to maintain compatibility with legacy UEs, i.e. previous versions of the LTE standard, it is beneficial that the existing LTE DMRS modulation sequences $\{a_p(k)\}$, described by equation (1), are allocated to the PDSCH, while the e-PDCCH-DMRS modulation sequence is a new modulation sequence $\{b_{u,p}(k)\}$. This means that $a_p(k)=w_p(k)q(n_{PRB},k)$, k=0, 1, . . . , 11 where $q(n_{PRB},k)$ is a PRB scrambling sequence according to 3GPP LTE standard.

Preferably, the e-PDCCH-DMRS modulation sequence $\{b_{u,p}(k)\}$, k=0, 1, . . . , L−1 is obtained by multiplying symbol-by-symbol the PDSCH-DMRS modulation sequence $\{a_p(k)\}$, k=0, 1, . . . , L−1 with a UE-specific e-PDDCH signature sequence $\{s_u(k)\}$, k=0, 1, . . . , L−1, i.e.

$$b_{u,p}(k)=a_p(k)s_u(k), k=0,1,\ldots,L-1 \quad (6)$$

where index u labels a u-th sequence from a set of U signature sequences that can possibly be allocated to one or more receiver nodes in the system. The index u may be implicitly or explicitly signaled to one or more receivers according to a further embodiment of the disclosure.

The number of symbols in a signature sequence L is 12, i.e. equal to the number of DMRS-REs in a PRB pair according to the latest version of the LTE standard (Rel. 10). It is, however, straightforward to use the above construction of e-PDCCH-DMRS modulation sequences with some other number L of DMRS-REs in a PRB pair.

An e-PDCCH signature sequence can be also represented by a matrix $S_u$, e.g. as:

$$S_u = \begin{bmatrix} s_u(0) & s_u(3) & s_u(6) & s_u(9) \\ s_u(1) & s_u(4) & s_u(7) & s_u(10) \\ s_u(2) & s_u(5) & s_u(8) & s_u(11) \end{bmatrix}. \quad (7)$$

In some deployment scenarios, the base station might decide to allocate the different frequency positions to PRBs scheduled jointly within a subframe. Even in that case a single UE-specific e-PDCCH signature sequence of L symbols can be associated to each such pair of PRBs, so that the symbols are mapped to e-PDCCH DMRS REs as described by the e-PDCCH signature matrix (7).

According to an embodiment that allows for very simple generation of e-PDCCH-DMRS modulation sequences, and for a simple searching procedure in the UE receiver, the e-PDCCH signature sequence can be a binary sequence with alphabet including two values, +1 and −1.

According to another embodiment the transmit node (e.g. base station or relay node) transmits simultaneously multiple e-PDCCH and PDSCH signals, corresponding to multiple UEs, over a common set of antenna ports, i.e. the cases when U>1.

If all the UEs share the same scrambling sequence in the corresponding PDSCH-DMRS modulation sequences (what depends on the base station scheduler decision), then using the same e-PDCCH signature sequence in all UE-specific e-PDCCH transmission makes it impossible for each of the involved UEs to tell whether the corresponding e-PDDCH signal is its own, or it belongs to some other UE. This UE-ambiguity can be optimally resolved by multiple, UE-specific orthogonal e-PDCCH signature sequences as described in the following disclosure.

For example, the set of 11 orthogonal binary e-PDCCH signature sequences of length 12 is given by the columns 2 to 12 of 12×12 Hadamard matrix H, where $$H = \begin{bmatrix}
+1 & -1 & -1 & -1 & -1 & -1 & -1 & -1 & -1 & -1 & -1 & -1 \\
+1 & +1 & -1 & +1 & -1 & -1 & -1 & +1 & +1 & +1 & -1 & +1 \\
+1 & +1 & +1 & -1 & +1 & -1 & -1 & -1 & +1 & +1 & +1 & -1 \\
+1 & -1 & +1 & +1 & -1 & +1 & -1 & -1 & -1 & +1 & +1 & +1 \\
+1 & -1 & +1 & +1 & -1 & +1 & -1 & -1 & -1 & +1 & +1 & +1 \\
+1 & +1 & +1 & -1 & +1 & +1 & -1 & +1 & -1 & -1 & -1 & +1 \\
+1 & +1 & +1 & +1 & -1 & +1 & +1 & -1 & +1 & -1 & -1 & -1 \\
+1 & -1 & +1 & +1 & +1 & -1 & +1 & +1 & -1 & +1 & -1 & -1 \\
+1 & -1 & -1 & +1 & +1 & +1 & -1 & +1 & +1 & -1 & +1 & -1 \\
+1 & -1 & -1 & -1 & +1 & +1 & -1 & +1 & +1 & -1 & +1 & -1 \\
+1 & +1 & -1 & -1 & -1 & +1 & +1 & -1 & +1 & +1 & -1 & +1 \\
+1 & -1 & +1 & -1 & -1 & -1 & +1 & +1 & +1 & -1 & +1 & +1
\end{bmatrix}. \quad (8)$$

The first column of (8), i.e. the vector of all +1s, can be interpreted as a transparent "PDSCH signature sequence", which means that each of the e-PDCCH-DMRS modulation sequences generated using the signature sequences (8) is orthogonal to the corresponding PDSCH-DMRS modulation sequence. The columns of H would remain orthogonal if the rows of H are permuted.

However, in some deployment scenarios it might be beneficial that the e-PDCCH signature sequences are also orthogonal over a number of symbols smaller than L. For example, the UEs that move at high speed, or have the different frequency positions allocated to PRBs scheduled jointly within a subframe, might benefit from performing the e-PDCCH detection independently in each slot. In that case the interference from other UE-specific e-PDCCH signature sequences would be minimized if all e-PDCCH signatures are orthogonal both over L symbols and over L/2 symbols.

Such e-PDCCH signatures can be obtained, for example, from the L×L orthogonal matrices that can be structured as:

$$G = \begin{bmatrix} A & A \\ A & -A \end{bmatrix}, \quad (9)$$

where A is an L/2×L/2 orthogonal matrix. For example, we can define an orthogonal matrix $A_0$ as the 6×6 DFT matrix, i.e.

$$A_0 = \begin{bmatrix} +1 & +1 & +1 & +1 & +1 & +1 \\ +1 & W_6^1 & W_6^2 & W_6^3 & W_6^4 & W_6^5 \\ +1 & W_6^2 & W_6^4 & +1 & W_6^2 & W_6^4 \\ +1 & W_6^3 & +1 & W_6^3 & +1 & W_6^3 \\ +1 & W_6^4 & W_6^2 & +1 & W_6^4 & W_6^2 \\ +1 & W_6^5 & W_6^4 & W_6^3 & W_6^2 & W_6^1 \end{bmatrix}, \quad (10)$$

where $W_6^1 = e^{i2\pi/6}$, $i=\sqrt{-1}$. If we insert $A_0$ in (9) we obtain the 12×12 matrix $G_0$, given as $$G_0 = \begin{bmatrix} +1 & +1 & +1 & +1 & +1 & +1 & +1 & +1 & +1 & +1 & +1 & +1 \\ +1 & W_6^1 & W_6^2 & W_6^3 & W_6^4 & W_6^5 & +1 & W_6^1 & W_6^2 & W_6^3 & W_6^4 & W_6^5 \\ +1 & W_6^2 & W_6^4 & +1 & W_6^2 & W_6^4 & +1 & W_6^2 & W_6^4 & +1 & W_6^2 & W_6^4 \\ +1 & W_6^3 & +1 & W_6^3 & +1 & W_6^3 & +1 & W_6^3 & +1 & W_6^3 & +1 & W_6^3 \\ +1 & W_6^4 & W_6^2 & +1 & W_6^4 & W_6^2 & +1 & W_6^4 & W_6^2 & +1 & W_6^4 & W_6^2 \\ +1 & W_6^5 & W_6^4 & W_6^3 & W_6^2 & W_6^1 & +1 & W_6^5 & W_6^4 & W_6^3 & W_6^2 & W_6^1 \\ +1 & +1 & +1 & +1 & +1 & +1 & -1 & -1 & -1 & -1 & -1 & -1 \\ +1 & W_6^1 & W_6^2 & W_6^3 & W_6^4 & W_6^5 & -1 & -W_6^1 & -W_6^2 & -W_6^3 & -W_6^4 & -W_6^5 \\ +1 & W_6^2 & W_6^4 & +1 & W_6^2 & W_6^4 & -1 & -W_6^2 & -W_6^4 & -1 & -W_6^2 & -W_6^4 \\ +1 & W_6^3 & +1 & W_6^3 & +1 & W_6^3 & -1 & -W_6^3 & -1 & -W_6^3 & -1 & -W_6^3 \\ +1 & W_6^4 & W_6^2 & +1 & W_6^4 & W_6^2 & -1 & -W_6^4 & -W_6^2 & -1 & -W_6^4 & -W_6^2 \\ +1 & W_6^5 & W_6^4 & W_6^3 & W_6^2 & W_6^1 & -1 & -W_6^5 & -W_6^4 & -W_6^3 & -W_6^2 & -W_6^1 \end{bmatrix}. \quad (11)$$

The corresponding orthogonal e-PDCCH signature sequences of length 12, being also orthogonal over the intervals of 6 symbols, as well as orthogonal to the "PDSCH signature sequence" over the intervals of 6 symbols, are given either by the columns 2 to 6, or by the columns 8 to 12 of matrix $G_0$.

Another interesting special case of (9) can be obtained by using any of quadriphase 6×6 orthogonal matrices $A=A_i$, $i=1, \ldots, 4$; for example as:

$$A_1 = \begin{bmatrix} +1 & +1 & +1 & +1 & +1 & +1 \\ +1 & -1 & -i & +1 & +i & -1 \\ +1 & +i & -1 & +i & -i & -i \\ +1 & +1 & -i & -1 & -1 & +i \\ +1 & -i & +i & -1 & +1 & -1 \\ +1 & -1 & +i & -i & -1 & +1 \end{bmatrix}, \quad (12)$$

$$A_2 = \begin{bmatrix} +1 & +1 & +1 & +1 & +1 & +1 \\ +1 & -1 & +i & +1 & -i & -1 \\ +1 & -i & -1 & -i & +i & +i \\ +1 & +1 & +i & -1 & -1 & -i \\ +1 & +i & -i & -1 & +1 & -1 \\ +1 & -1 & -i & +i & -1 & +1 \end{bmatrix}, \quad (13)$$

$$A_3 = \begin{bmatrix} +1 & +1 & +1 & +1 & +1 & +1 \\ +1 & -1 & -i & -i & +i & +i \\ +1 & +i & -1 & +1 & -i & -1 \\ +1 & +i & +1 & -1 & -1 & -i \\ +1 & -i & +i & -1 & +1 & -1 \\ +1 & -i & -1 & +i & -1 & +1 \end{bmatrix}, \quad (14)$$

$$A_4 = \begin{bmatrix} +1 & +1 & +1 & +1 & +1 & +1 \\ +1 & -1 & +i & +i & -i & -i \\ +1 & -i & -1 & +1 & +i & -1 \\ +1 & -i & +1 & -1 & -1 & +i \\ +1 & +i & -i & -1 & +1 & -1 \\ +1 & +i & -1 & -i & -1 & +1 \end{bmatrix}. \quad (15)$$

For example, if we insert $A_1$ in (9) the corresponding orthogonal e-PDCCH signature sequences of length 12, being also orthogonal over the intervals of 6 symbols, as well as orthogonal to the "PDSCH signature sequence" over the intervals of 6 symbols, are given by the columns 2 to 6 and 8 to 12 of the 12×12 matrix $G_1$, given as:

$$G_1 = \begin{bmatrix} +1 & +1 & +1 & +1 & +1 & +1 & +1 & +1 & +1 & +1 & +1 & +1 \\ +1 & -1 & -i & +1 & +i & -1 & +1 & -1 & -i & +1 & +i & -1 \\ +1 & +i & -1 & +i & -i & -i & +1 & +i & -1 & +i & -i & -i \\ +1 & +1 & -i & -1 & -1 & +i & +1 & +1 & -i & -1 & -1 & +i \\ +1 & -i & +i & -1 & +1 & -1 & +1 & -i & +i & -1 & +1 & -1 \\ +1 & -1 & +i & -i & -1 & +1 & +1 & -1 & +i & -i & -1 & +1 \\ +1 & +1 & +1 & +1 & +1 & +1 & -1 & -1 & -1 & -1 & -1 & -1 \\ +1 & -1 & -i & +1 & +i & -1 & -1 & +1 & +i & -1 & -i & +1 \\ +1 & +i & -1 & +i & -i & -i & -1 & -i & +1 & -i & +i & +i \\ +1 & +1 & -i & -1 & -1 & +i & -1 & -1 & +i & +1 & +1 & -i \\ +1 & -i & +i & -1 & +1 & -1 & -1 & +i & -i & +1 & -1 & +1 \\ +1 & -1 & +i & -i & -1 & +1 & -1 & +1 & -i & +i & +1 & -1 \end{bmatrix}. \quad (16)$$

The orthogonal e-PDCCH signature sequences can be labeled by an index u=0, 1, . . . , L−2 (from the set of U signature sequences), so a UE-specific e-PDCCH signature sequence is obtained by allocating a certain value of u to a specific UE. The allocation of e-PDCCH signature sequences to specific UEs can be done, for example, by specifying in the standard the index u as a function of some UE identification number in the network, known as Radio Network Temporary Identifier (RNTI) in the LTE standard, which is signaled to each UE by the base station once the connection is established. The other option is to send the index u to the UE by higher layer signaling (through PDSCH) to be used in a subsequent scheduling interval. Therefore, both implicit and explicit signaling of the index u or equivalent may be performed by the system.

Regarding the method in the receiver node, mentioned method according to an embodiment of the disclosure further comprises: searching for the second receiver specific demodulation reference signal (e-PDCCH-DMRS) in all PRBs within a given time-frequency search space so as to identify PRBs allocated for receiver specific control channel signals (e-PDCCHs). Preferably, the search is performed in all antenna ports that are used for transmission of the second receiver specific demodulation reference signal (e-PDCCH-DMRS) if multiple antenna ports are used in the transmissions.

According to yet another embodiment the searching step further includes:

i. identifying a set of candidate e-PDCCH PRB pairs by searching the given time-frequency search space for a UE-specific and e-PDCCH-specific DMRS modulation sequence; and ii. demodulating and performing CRC check for candidates belonging to the set, and if a CRC check is positive for a candidate—assume that the candidate is correct.

Moreover, the searching may further involve:

iii. performing blind detection on the remaining e-PDCCH PRB pairs in the given time-frequency search space if step ii) above does not result in a positive CRC check.

Hence, in other words: if there is more than one e-PDCCH signature sequence, the e-PDCCH searching algorithm should be adapted to encompass the corresponding additional detection statistics. Besides, the searching algorithm can be done in several iterations. In the first iteration the UE can identify the set of candidate, i.e. potential e-PDCCH PRB pairs, by searching for its own e-PDCCH-DMRS modulation sequence over the whole given time-frequency search space; in the second iteration the UE performs one-by-one demodulation of each candidate e-PDCCH PRB pair and performs the CRC check: if the CRC check of selected candidate e-PDCCH PRB pair is positive, the e-PDCCH is considered successfully detected and decoded. If not, the UE move on to another candidate e-PDCCH PRB pair in the set. If none of the candidate e-PDCCH PRB pairs produces a successful CRC check, the UE should perform e-PDCCH blind detection on the remaining PRB pairs in the time-frequency search space.

If only one UE is scheduled at the time, the same e-PDCCH signature can be shared between multiple UEs. In that case a basic implementation of an e-PDCCH searching procedure in the receiver node may comprise of the following steps:

1) Decomposing all received OFDM symbols within a subframe into subcarriers with corresponding modulation symbols, 2) Selecting in the decomposed received signal the PRB pair in the frequency domain which has not been searched;

3) Assuming certain DMRS port;

4) Re-modulating REs that are allocated to the assumed DMRS port with the complex-conjugate of the corresponding PDSCH-DMRS modulation sequence; such re-modulated RE-s represent the first propagation channel estimate;

5) Re-modulating the first propagation channel estimate with the complex-conjugate of the e-PDCCH signature sequence, to obtain the second propagation channel estimate;

6) Summing all the samples of the first propagation channel estimate, and then find the (squared) absolute value of the sum, to obtain the first detection statistic;

7) Summing all the samples of the second propagation channel estimate, and then find the (squared) absolute value of the sum, to obtain the second detection statistic;

8) Finding the maximum detection statistic;

9) Comparing the maximum detection statistic with an estimated noise-level threshold, to determine whether the observed PRB pair contains a DMRS transmission;

10) Choosing, if the observed PRB contains a DMRS transmission, the PRB affiliation (PDSCH or e-PDCCH) that corresponds to the maximum detection statistic, otherwise repeat the procedure starting from step 2;

11) Repeating, if the observed PRB pair was a PDSCH PRB pair, the procedure starting from the step 2.

The above searching procedure can be easily adapted to the case when the different UE-specific e-PDCCH signatures are assigned to different frequency positions of PRB pairs of a given UE. However, the searching procedure will be simpler if a single, common UE-specific e-PDCCH signature is assigned to any frequency position of PRB pairs of a given UE.

The above searching procedure is based on the aforementioned fact that the LTE standard specifies that the proprietary precoding of antenna ports 7 to 14 at the base station has to be constant over all subcarrier frequencies of at least one PRB bandwidth. Consequently, if the channel estimate samples within a PRB pair are summed together, a common precoding coefficient can be drawn out of sum, so it does not influence the outcome of the comparison of detection statistics. From the same reason the e-PDCCH detection performances will be optimum if the propagation channel is constant over a PRB pair.

Moreover, in the above searching procedure, the step of re-modulating the REs with the complex-conjugate of the corresponding PDSCH-DMRS modulation sequence, includes the UE-specific scrambling sequence, as describe earlier. The UE-specific parameter of the scrambling sequences in the existing LTE transmission modes is sent to the UE via PDCCH, which is demodulated by CRS. However, it has been assumed that there is no PDCCH and no CRS, which means that either the UE has to make search for e-PDCCH using both versions of the scrambling sequence, or the UE-specific scrambling sequences parameter has to be sent to the UE by higher layer signaling (through PDSCH) to be used in a subsequent scheduling interval.

Furthermore, as understood by the person skilled in the art, any method according to the present disclosure may also be implemented in a computer program, having code, which when run in a computer causes the computer to execute the steps of the method. The computer program is included in a computer readable medium of a computer program product. The computer readable medium may include any memory, such as a ROM (Read-Only Memory), a PROM (Programmable Read-Only Memory), an EPROM (Erasable PROM), a Flash memory, an EEPROM (Electrically Erasable PROM), or a hard disk drive.

The disclosure further relates to a transmit device and a receiver device corresponding to the above methods. It should be noted that the transmit device and receiver device can be modified, mutatis mutandis, according to the different embodiments of aforementioned methods. The devices comprise the suitable means for providing the functions described above. These means may e.g. be: processing means, transmitting means, receiving means, memory means, buffer means, antenna means, etc.

Finally, it should be understood that the present disclosure is not limited to the embodiments described above, but also relates to and incorporates all embodiments within the scope of the appended independent claims.

The invention claimed is:

1. An apparatus, comprising:
a receiver configured to receive communication signals;
a memory containing computer instructions for execution by at least one processor; and
at least one processor coupled to retrieve and execute the computer instructions wherein, when executed by the at least one processor, cause the apparatus to:
receive and process at least one first receiver specific demodulation reference signal associated with a data channel having time-frequency resource elements (REs) of a first physical resource block (PRB) that are utilized for transmission of the data channel and the at least one first receiver specific demodulation reference signal, and also having time-frequency REs of the first PRB that are utilized for transmission of the at least one first receiver specific demodulation reference signal located in a first set of RE positions in the first PRB,
receive at least one second receiver specific demodulation reference signal associated with a control channel that is associated with the data channel, the at least one second receiver specific demodulation reference signal being different from the at least one first receiver specific demodulation reference signal, wherein:
time-frequency REs of a second PRB are utilized for transmission of the control channel and the at least one second receiver specific demodulation reference signal,
time-frequency REs of the second PRB being utilized for transmission of the at least one second receiver specific demodulation reference signal located in a second set of RE positions in the second PRB, and
the second set of RE positions in the second PRB overlap with the first set of RE positions in the first PRB, and a first sequence of symbols $\{a_p(k)\}$, $k=0, 1, \ldots, L-1$ is used for modulating time-frequency REs at a first set of RE positions in a first PRB for generation of the at least one first receiver specific demodulation reference signal, the first PRB being used for transmission of the data channel at a transmitting antenna port p, and L is a positive integer; and
demodulate the control channel by using the at least one second receiver specific demodulation reference signal.

2. The apparatus according to claim 1, wherein the first sequence of symbols $\{a_p(k)\}$, $k=0, 1, \ldots, L-1$ is defined as: $a_p(k)=w_p(k)q(n_{PRB}, k)$, $k=0, 1, \ldots, 11$, where $q(n_{PRB}, k)$ is a PRB scrambling sequence.

3. The apparatus according to claim 1, wherein a second sequence of symbols $\{b_{u,p}(k)\}$, $k=0, 1, \ldots, L-1$ is used for modulating time-frequency resource elements within a second physical resource blocks for generation of the second receiver specific demodulation reference signal, and the second physical resource being used for transmission of the control channel at a transmit antenna port p, L is a positive integer.

4. The apparatus according to claim 3, wherein the second sequence of symbols $\{b_{u,p}(k)\}$ being a u-th sequence from a set of U sequences, u and U being positive integers, the set of U sequences being capable of being allocated to one or more receiver nodes in the wireless communication system.

5. The apparatus according to claim 3, wherein the second sequence of symbols $\{b_{u,p}(k)\}$, $k=0, 1, \ldots, L-1$ is obtained by multiplying a first sequence of symbols $\{a_p(k)\}$, $k=0, 1, \ldots, L-1$ with a receiver specific signature sequence $\{s_u(k)\}$, $k=0, 1, \ldots, L-1$.

6. The apparatus according to claim 1, wherein the at least one first receiver specific demodulation reference signal is modulated in a way different from the way that the at least one second receiver specific demodulation reference signal is modulated.

7. An apparatus, comprising:
transceiver circuitry; and
processing circuitry coupled to the transceiver circuitry, wherein the apparatus is configured to:
transmit at least one first receiver specific demodulation reference signal associated with a data channel, having time-frequency resource elements (REs) of a first physical resource block (PRB) for transmission of the data channel and the at least one first receiver specific demodulation reference signal, and time-frequency REs of the first PRB being utilized for transmission of the at least one first receiver specific demodulation reference signal located in a first set of RE positions in the first PRB; and
transmit at least one second receiver specific demodulation reference signal associated with a control channel associated with the data channel, the at least one second receiver specific demodulation reference signal is different from the at least one first receiver specific demodulation reference signal, time-frequency REs of a second PRB are utilized for transmission of the control channel and the at least one second receiver specific demodulation reference signal, the time-frequency REs of the second PRB are further utilized for transmission of the at least one second receiver specific demodulation reference signal located in a second set of RE positions in the second PRB, and the second set of RE positions in the second PRB overlap with the first set of RE positions in the first PRB, wherein a first sequence of symbols $\{a_p(k)\}$, $k=0, 1, \ldots, L-1$ is used for modulating time-frequency REs at a first set of RE positions in a first PRB for generation of the at least one first receiver specific demodulation reference signal, the first PRB being used for transmission of the data channel at a transmitting antenna port p, and L is a positive integer.

8. The apparatus according to claim 7, wherein the first sequence of symbols $\{a_p(k)\}$, $k=0, 1, \ldots, L-1$ is defined as: $a_p(k)=w_p(k)q(n_{PRB}, k)$, $k=0, 1, \ldots, 11$, where $q(n_{PRB}, k)$ is a PRB scrambling sequence.

9. The apparatus according to claim 7, wherein a second sequence of symbols $\{b_{u,p}(k)\}$, $k=0, 1, \ldots, L-1$ is used for modulating time-frequency resource elements within a second physical resource blocks for generation of the second receiver specific demodulation reference signal, and the second physical resource being used for transmission of the control channel at a transmit antenna port p, and L is a positive integer.

10. The apparatus according to claim 9, wherein the second sequence of symbols $\{b_{u,p}(k)\}$ being a u-th sequence from a set of U sequences, u and U being positive integers, the set of U sequences being capable of being allocated to one or more receiver nodes in the wireless communication system.

11. The apparatus according to claim 9, wherein the second sequence of symbols $\{b_{u,p}(k)\}$, $k=0, 1, \ldots, L-1$ is obtained by multiplying a first sequence of symbols $\{a_p(k)\}$, $k=0, 1, \ldots, L-1$ with a receiver specific signature sequence $\{s_u(k)\}$, $k=0, 1, \ldots, L-1$.

12. The apparatus according to claim 7, wherein the at least one first receiver specific demodulation reference signal is modulated in a way different from the way that the at least one second receiver specific demodulation reference signal is modulated.

13. The apparatus according to claim 7, wherein the control channel is a physical downlink control channel, and the data channel is a physical downlink shared channel.

14. A communications system, comprising:
a first apparatus, configured to transmit at least one first receiver specific demodulation reference signal associated with a data channel, wherein time-frequency resource elements (REs) of a first physical resource block (PRB) are utilized for transmission of the data channel and the at least one first receiver specific demodulation reference signal, and time-frequency REs of the first PRB being utilized for transmission of the at least one first receiver specific demodulation reference signal located in a first set of RE positions in the first PRB, and to transmit at least one second receiver specific demodulation reference signal associated with a control channel, wherein the control channel is associated with the data channel, the at least one second receiver specific demodulation reference signal is different from the at least one first receiver specific demodulation reference signal, time-frequency REs of a second PRB are utilized for transmission of the control channel and the at least one second receiver specific demodulation reference signal, the time-frequency REs of the second PRB are further utilized for transmission of the at least one second receiver specific demodulation reference signal located in a second set of RE positions in the second PRB, and the second set of RE positions in the second PRB overlap with the first set of RE positions in the first PRB, wherein a first sequence of symbols $\{a_p(k)\}$, $k=0,1, \ldots, L-1$ is used for modulating time-frequency REs at a first set of RE positions in a first PRB for generation of the at least one first receiver specific demodulation reference signal, the first PRB being used for transmission of the data channel at a transmitting antenna port p, and L is a positive integer; and
a second apparatus, configured to receive the at least one first receiver specific demodulation reference signal and the at least one second receiver specific demodulation reference signal, and to demodulate the control channel by using the at least one second receiver specific demodulation reference signal.

15. The system according to claim 14, wherein the first sequence of symbols $\{a_p(k)\}$, $k=0,1, \ldots, L-1$ is defined as: $a_p(k)=w_p(k)q(n_{PRB}, k)$, $k=0,1, \ldots, 11$, where $q(n_{PRB}, k)$ is a PRB scrambling sequence.

16. The system according to claim 14, wherein a second sequence of symbols $\{b_{u,p}(k)\}$, $k=0,1, \ldots, L-1$ is used for modulating time-frequency resource elements within a second physical resource blocks for generation of the second receiver specific demodulation reference signal, and the second physical resource being used for transmission of the control channel at a transmit antenna port p, and L is a positive integer.

17. The system according to claim 16, wherein the second sequence of symbols $\{b_{u,p}(k)\}$ being a u-th sequence from a set of U sequences, u and U being positive integers, the set of U sequences being capable of being allocated to one or more receiver nodes in the system.

18. The system according to claim 16, wherein the second sequence of symbols $\{b_{u,p}(k)\}$, $k=0,1, \ldots, L-1$ is obtained by multiplying a first sequence of symbols $\{a_p(k)\}$, $k=0,1, \ldots, L-1$ with a receiver specific signature sequence $\{s_u(k)\}$, $k=0,1, \ldots, L-1$.

19. The system according to claim 14, wherein the at least one first receiver specific demodulation reference signal is modulated in a way different from the way that the at least one second receiver specific demodulation reference signal is modulated.

20. The system according to claim 14, wherein the control channel is a physical downlink control channel, and the data channel is a physical downlink shared channel.

* * * * *